United States Patent [19]

Maeda et al.

[11] Patent Number: 5,786,947

[45] Date of Patent: Jul. 28, 1998

[54] OPTICAL PICKUP DEVICE WITH A FLOATING ELEMENT

[75] Inventors: Fumisada Maeda, Tokyo; Isao Ichimura, Kanagawa; Kenji Yamamoto, Saitama; Kiyoshi Ohsato, Chiba; Toshio Watanabe, Kanagawa, all of Japan

[73] Assignee: Sony Corporation, Japan

[21] Appl. No.: 834,147

[22] Filed: Apr. 14, 1997

Related U.S. Application Data

[63] Continuation of Ser. No. 597,978, Feb. 7, 1996.

[30] Foreign Application Priority Data

Feb. 15, 1995 [JP] Japan ................... 7-026562

[51] Int. Cl.[6] ........................................ G02B 7/02
[52] U.S. Cl. ........................................ 359/822; 359/819
[58] Field of Search ........................ 359/811, 819, 359/822; 369/44.15, 44.16, 44.17, 44.18, 44.19, 44.2

[56] References Cited

U.S. PATENT DOCUMENTS

| | | | |
|---|---|---|---|
| 5,125,750 | 6/1992 | Corle et al. | 359/819 |
| 5,247,503 | 9/1993 | Nomiyama et al. | 369/44.35 |
| 5,295,122 | 3/1994 | Murakami et al. | 369/13 |
| 5,307,336 | 4/1994 | Lee et al. | 369/112 |
| 5,497,359 | 3/1996 | Mamin | 369/44.15 |
| 5,615,203 | 3/1997 | Fukakusa | 369/244 |

*Primary Examiner*—Georgia Y. Epps
*Assistant Examiner*—Ricky Mack
*Attorney, Agent, or Firm*—Ronald P. Kananen

[57] ABSTRACT

An optical pickup device for condensing the light from a light source on a signal recording surface of an optical recording medium, such as an optical disc. A semi-spherical lens of the optical pickup device has a surface 9b facing an optical disc 20 and has a pre-set refractive index. The optical pickup device also has a slider 12 adapted for securing the lens 9 and for being in sliding contact with an optical disc 20, and a spring plate 13 adapted for thrusting and supporting the slider in sliding contact with the optical disc 20. With the optical pickup device, high density reproduction may be realized, while the tolerance value for warping during disc molding or the tolerance value for warping due to moisture absorption may be increased. In addition, the production yield and the degree of freedom in selecting the disc materials may be improved.

11 Claims, 6 Drawing Sheets

111
OPTICAL PICKUP DEVICE WITH A FLOATING ELEMENT

This application is a continuation of application Ser. No. 08/597,978 filed Feb. 7, 1996.

BACKGROUND OF THE INVENTION

This invention relates to an optical pickup device for condensing the light from a light source on a signal recording surface of an optical recording medium, such as an optical disc.

The recent tendency in the package media such as a recording device for a computer or package media for music or picture information is towards a higher information recording density. Among the methods for high recording density, there is a method of increasing the numerical aperture of an objective lens for diminishing the diameter of a light spot condensed on the disc.

Assuming that information signals recorded with a high recording density as information pits are to be reproduced by the optical pickup device, small-sized recording marks can be reproduced if the spot diameter is decreased, thus achieving high recording density.

If the numerical aperture of the objective lens is increased, manufacture of the objective lens itself becomes difficult.

If an optical disc substrate is tilted in the condensing light, coma aberration is produced. This coma aberration is increased if the numerical aperture NA of the objective lens is increased. For example, the third-order coma aberration $W_{31}$ and the fifth-order coma aberration $W_{51}$ are represented by the equations (1) and (2):

$$W_{31} = \frac{t}{2} * \frac{N^2 - 1}{N^3} \theta * NA^3 \quad (1)$$

$$W_{51} = \frac{t}{8} * \frac{(N^2 - 1)(N^2 + 3)}{N^5} \theta * NA^5 \quad (2)$$

where t is the disc thickness, N is the refractive index of the disc, NA is the numerical aperture of the objective lens and θ is the skew of the optical disc.

Thus it is seen that the coma aberration is in conformity to the size of the numerical aperture NA. That is, if the numerical aperture of the objective lens is increased, the tolerance value of the planarity of the optical disc, that of orthogonality between the optical disc and the disc mounting surface and that of feed precision of the optical pickup device are diminished.

If, for example, the thickness of the optical disc substrate is 1.2 mm, the refractive index of the optical disc substrate is 1.52 and the wavelength of the light from the light source is 532 nm, with the tolerance value of the RMS wavefront aberration produced due to disc skew in case of employing only the objective lens being 0.05 λ, the tolerance value for the skew is decreased with an increase in the numerical aperture of the objective lens as shown in FIG. 8. Thus a skew correction mechanism for correcting the skew needs to be added thus resulting in disadvantages in cost and size.

If the thickness of the optical disc substrate is outside of the prescribed range, a spherical aberration $W_{40}$ is produced. This spherical aberration $W_{40}$ is given by $$W_{40} = \frac{\Delta t}{8} * \frac{N^2 - 1}{N^3} NA^4 \quad (3)$$

indicating that the spherical aberration is in conformity to the magnitude of the numerical aperture NA. That is, if the numerical aperture of the objective lens is increased, spherical aberration is produced, so that disc thickness needs to be managed strictly thus raising difficulties in production yield and cost.

OBJECT AND SUMMARY OF THE INVENTION

It is an object of the present invention to provide an optical pickup device in which the diameter of the spot formed on the optical recording medium is diminished, with the generation of coma aberration being made irrelevant to the increase in the numerical aperture of the objective lens, for realizing high information recording and reproducing density.

In one aspect, the present invention provides an optical pickup device for collecting the light from a light source on a signal recording surface of an optical recording surface including at least a set of objective lenses, a convex lens having a planar surface facing the optical recording medium and having a pre-set refractive index, a slider configured for fixing the convex lens and for sliding in contact with the optical recording medium, and thrusting supporting means for thrusting the slider into sliding supporting contact with said optical recording medium.

In another aspect, the present invention provides an optical pickup device for collecting the light from a light source on a signal recording surface of an optical recording surface including at least a set of objective lenses, a convex lens having a planar surface facing the optical recording medium and having a pre-set refractive index, slider configured for fixing the convex lens and for being floated over the optical recording medium, and floating supporting means for floating and supporting the slider over the optical recording medium.

Since the refractive index of the convex lens is set so as to be equal to that of the optical recording medium, a laser light having a reduced spot diameter may be condensed at a pre-set position of an information recording layer of the optical recording medium.

DESCRIPTION OF THE PREFERRED EMBODIMENTS

Figure 1:
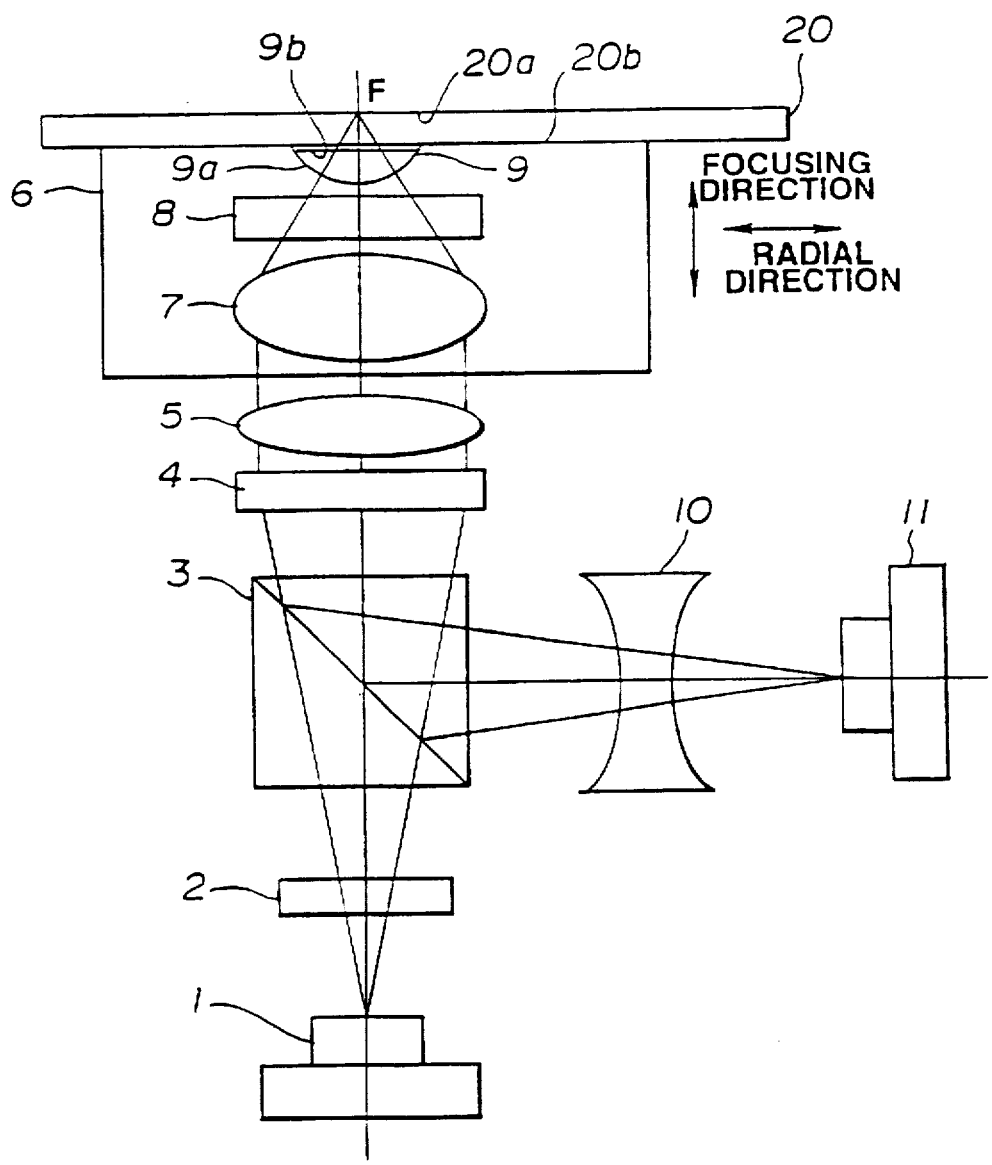
FIG. 1 is a schematic view showing an embodiment of an optical pickup device according to the present invention.

Referring to the drawings, illustrative embodiments of the present invention will be explained in detail.

Figure 2:
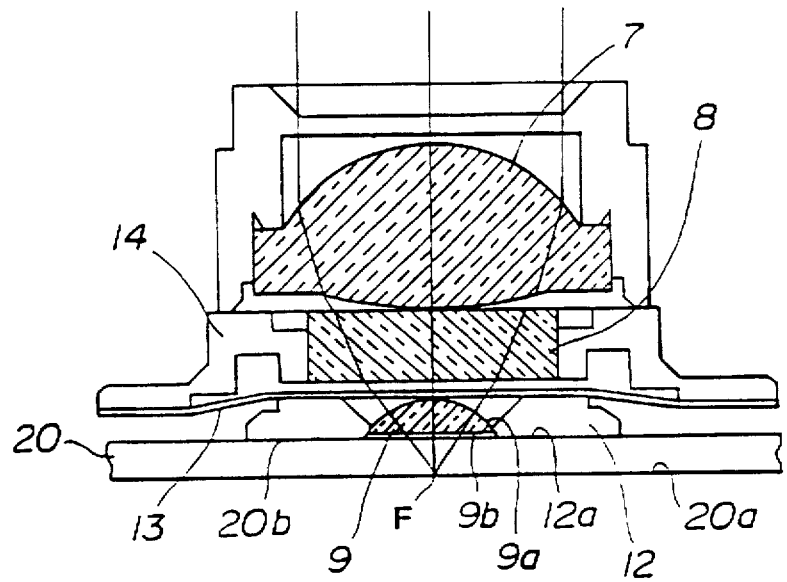
FIG. 2 is a detailed view showing an objective lens system of the embodiment shown in FIG. 1.

The optical pickup device of the instant embodiment is configured for reproducing information signals pre-recorded with high recording density on a signal recording surface of an optical disc which is among the optical recording media. Referring to FIGS. 1 and 2, the optical pickup device includes at least a set of objective lenses 7, and a semi-spherical lens 9, which is a convex lens of a pre-set refractive index having a surface 9b facing the optical disc 20. The optical pickup device also includes a slider 12 having a semi-spherical lens 9 secured thereto and a spring plate 13 as pressing and supporting means for pressing the slider 12 into sliding supporting contact with the optical disc 20. The semi-spherical lens 9 is configured for having a sliding contact with the optical disc 20.

The optical pickup device of the instant embodiment also includes a correction plate 8 between the objective lens 7 and the semi-spherical lens 9. The correction plate 8 operates as correction means for correcting the laser light beam incident on the objective lens 7 from a light source into a spherical wave laser light beam centered about a pre-set position of a signal recording surface 20a of the optical disc 20.

The overall construction of the above-described optical pickup device is explained by referring to FIG. 1. The optical pickup device causes a laser light beam from a laser diode 1 as the light source to fall on an objective lens system 6 via a grating 2, a polarized beam splitter 3, a quarter wave plate 4 and a collimator lens 5, for illuminating the light beam on the signal recording surface 20a of the optical disc 20 by the objective lens system 6. The optical pickup device then conducts the return light from the signal recording surface 20a via a light condensing lens 10 on a photodetector 11, as light detection means, for reproducing information signals.

The linear polarized laser light beam, radiated from the laser diode 1, is diffracted by the grating 2 and subsequently transmitted through the polarized beam splitter 3 so as to fall on the quarter wave plate 4. The diffracted laser light is converted by the quarter wave plate 4 into a circular polarized light. The circular polarized light thus produced is collimated by the collimator lens 5 to a collimated beam which is incident on the objective lens system 6.

This objective lens system 6 includes the objective lens 7, correction plate 8 and the semi-spherical lens 9 and illuminates a point F on the signal recording surface 20a of the optical disc 20 with the laser light beam without producing an optical path difference. The correction plate 8 corrects the incident laser light so that the incident laser light beam incident on the objective lens 7 will become a spherical wave laser light beam substantially centered about the point F at a time point the incident laser light beam incident on the objective lens 7 is radiated from the correction plate 8. The semi-spherical lens 9 is made up of a spherical surface and the planar surface 9b and has its center of curvature substantially coincident with the point F.

Figure 3:
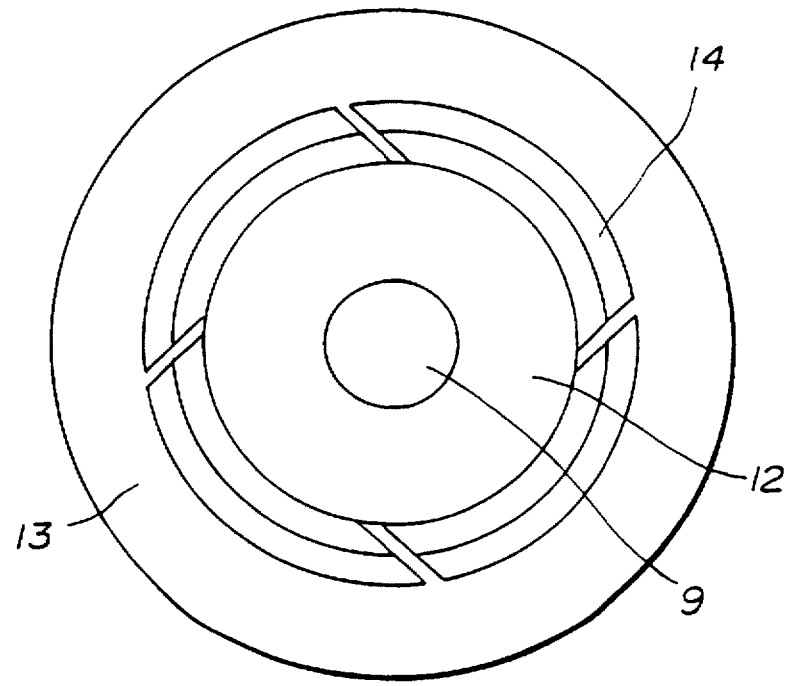
FIG. 3 is a plan view showing an objective lens system shown in FIG. 2.

FIGS. 2 and 3 show a detailed construction of the objective lens system 6 in a cross-sectional view and in a schematic view looking from the optical disc 20, respectively.

The objective lens 7 and the correction plate 8 are fixed in a tube barrel 14 and are constrained to each other without having any degree of freedom in any directions. The semi-spherical lens 9 is secured to the slider 12. The slider 12 and the lens barrel 14 are interconnected by the spring plate 13 such that the slider and the lens barrel have the degree of freedom of translatory movement with respect to the direction of the plate thickness of the optical disc 20 and the degree of freedom of tilting movement for following up with the tilting movement of the optical disc 20. The slider 12 is pressed against the optical disc 20 by the spring plate 13 so that the sliding surface 12a of the slider 12 will be in sliding contact with a light incident surface 20b of the optical disc 20. The spring plate 13 lacks in the degree of freedom of movement in a direction parallel to the light incident surface 20b so that no position shift is produced in the objective lens 7 and the semispherical lens 9 relative to the direction parallel to the light incident surface 20b. The slider 12 has a sliding surface 12a substantially parallel to the planar surface 9b of the semi-spherical lens 9, with the sliding surface 12a and the planar surface 9b being substantially co-planar except in an area of contact of the semi-spherical lens 9 with the optical disc 20. In effect, the planar surface 9b of the semi-spherical lens 9 is spaced a distance of approximately several micrometers from the sliding surface 12a of the slider 12.

The operation of the objective lens system 6 is hereinafter explained.

The laser light beam incident from the laser diode 1 as a light source on the objective lens 7 is converged by the objective lens 7 so as to reach the correction plate 8. The correction plate 8 has its plate thickness and refractive index set so that, at a time point when the converged laser light beam is radiated from the correction plate 8, the converged laser light becomes a spherical wave centered about the point F. The semi-spherical lens 9 has its radius of curvature substantially coincident with the point F. The refractive indices of the optical disc 20 and the semi-spherical lens 9 are pre-set so as to be substantially equal to each other. Thus the laser light beam radiated from the correction plate 8 is incident on the spherical surface 9a of the semi-spherical lens 9 in a direction perpendicular thereto and is converged at the point F so as to become a spherical wave centered about the point F.

Figure 4:
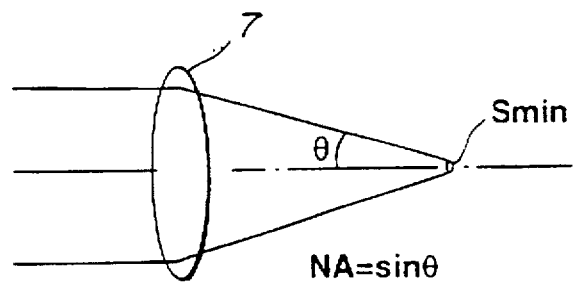
FIG. 4 illustrates a numerical aperture of the objective lens.

The objective lens has a numerical aperture NA=sin θ, where θ is an angle the objective lens subtends at the minimum size spot $S_{min}$, as shown in FIG. 4. The numerical aperture NA of the objective lens 6 is Nsinθ, where θ is the refractive index of each of the semi-circular lens 9 and the optical disc 20. Thus, by employing the objective lens system 6, the spot diameter becomes equal to 1/N of the spot diameter obtained with the objective lens 7, thus increasing the reproducing density of the optical disc 20.

Figure 5:
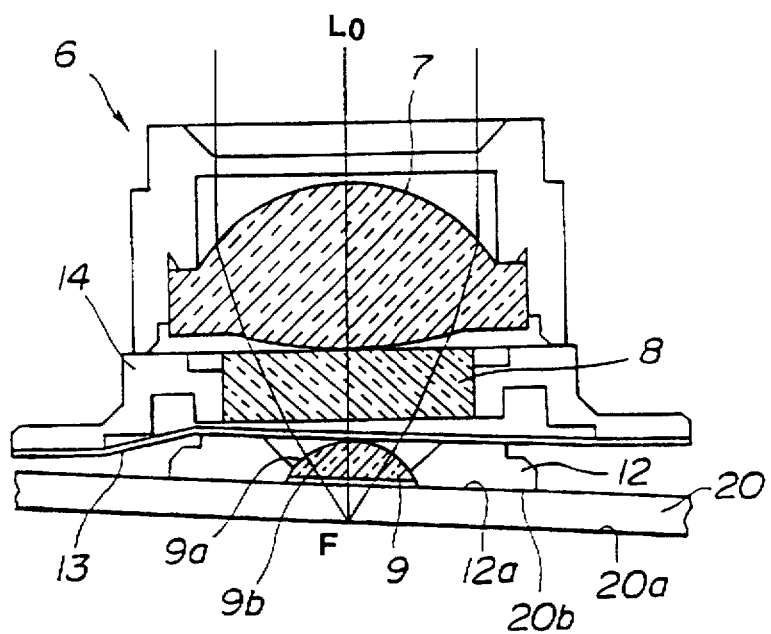
FIG. 5 illustrates the operation of the objective lens system shown in FIG. 2.

Referring to FIG. 5, the operation of the objective lens system 6, when the optical disc 20 is inclined relative to the optical axis Lo of the objective lens 7, is hereinafter explained.

If the optical disc 20 is tilted relative to the optical axis Lo, the spring plate 13 causes the sliding surface 12a of the slider 12 to be kept in sliding contact with the light incident surface 20b of the optical disc 20, so that the center of curvature of the semi-spherical lens 9 is substantially coincident with the optical axis Lo of the objective lens 7. Thus the laser light beam radiated from the correction plate 8 is incident on the spherical surface 9a of the semi-spherical lens 9 in a perpendicular direction without producing light path length differences. Thus there is produced no coma aberration despite the numerical aperture Nsinθ of the objective lens system. The result is that the tolerance values for warping during disc molding and warping by moisture absorption may be increased thus increasing the production yield and the degree of freedom in selection of the disc material. The tolerance value of the orthogonality between the optical axis and the disc mounting surface in the optical disc drive and the tolerance value of the pickup feed accuracy may be increased while the optical disc drive may be reduced in production cost. In addition, since there is no necessity of appending a disc skew correction mechanism in the optical disc drive, the optical pickup device may be reduced in size and weight and also in production cost while being improved in operational reliability.

It is now assumed that the substrate thickness of the optical disc 20 is varied by $\Delta t$ mm. If the radius of curvature of the semi-spherical lens 9 is a mm, a difference in spherical aberration $W'_{40}$ ascribable to the objective lens system 6 is given by:

$$W'_{40} = \frac{(\Delta t)^2}{8a} \cdot N(N-1)\sin^4\theta \quad (4)$$

where N is a refractive index of each of the semi-spherical lens 9 and the optical disc 20.

Figure 6:
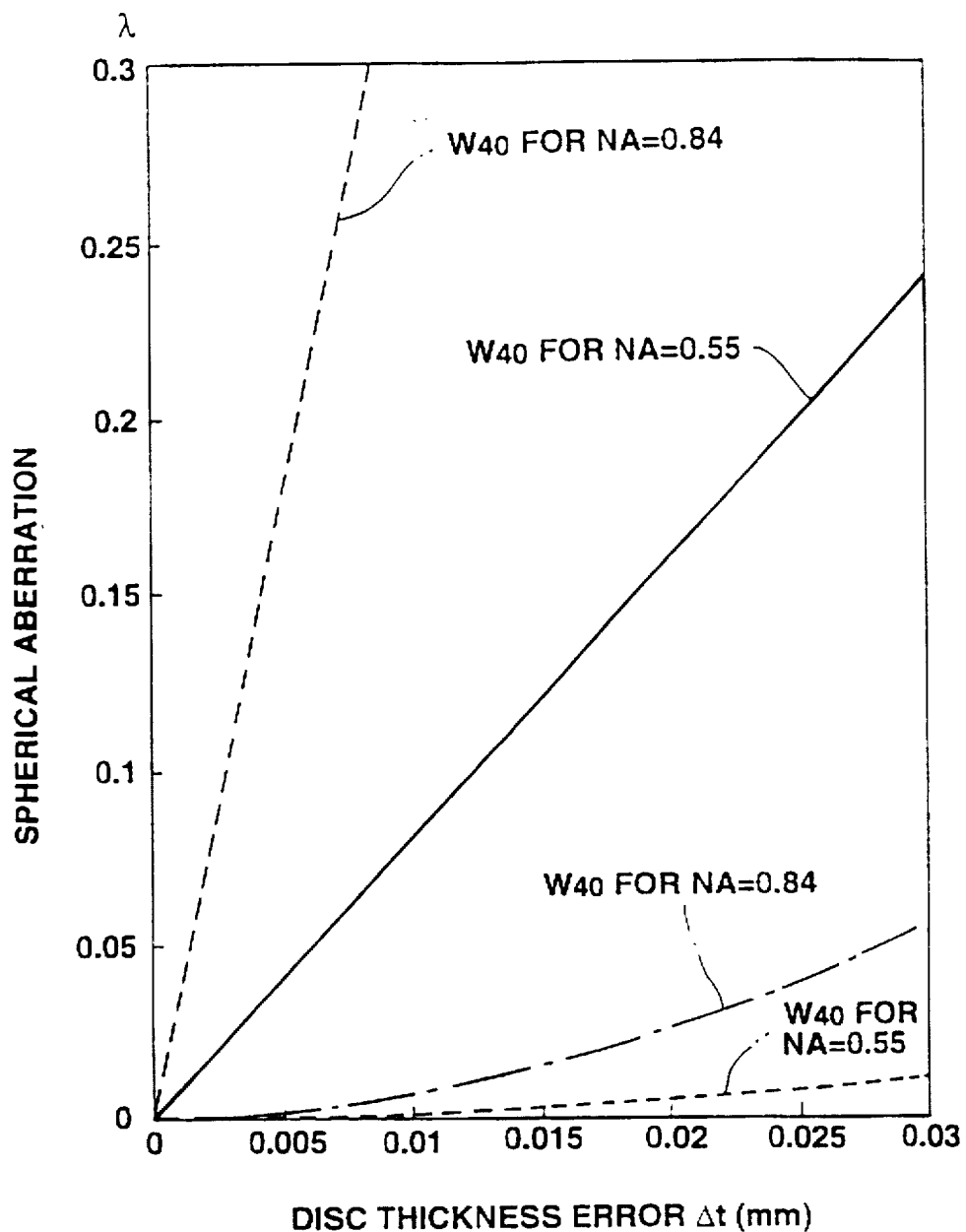
FIG. 6 is a graph showing spherical aberration plotted against errors in disc thickness.

Referring to FIG. 6, the spherical aberration $W'_{40}$ shown in the equation (4) is compared to the spherical aberration $W_{40}$ shown in FIG. 3. FIG. 6 shows a curve representing changes in the spherical aberration $W'_{40}$ or $W_{40}$ relative to the variation $\Delta t$ of the substrate thickness for the substrate thickness of 1.2 mm, refractive index N of 1.52 and the wavelength $\lambda$ of the light source of 532 nm. The radius of curvature of the semi-spherical lens 9 of the objective lens system 6 is 1.5 mm. In FIG. 6, the abscissa and the ordinate stand for disc thickness variation (error) $\Delta t$ mm and the spherical aberration, respectively.

The spherical aberration $W_{40}$ shown by the equation (3) is found on the assumption that the converging system for the laser light on the objective lens is made up only of the objective lens. Specifically, the numerical aperture NA of the objective lens 6 is set to two illustrative values of 0.55 and 0.84.

The spherical aberration $W'_{40}$ is found on the assumption that the converging system is made up of the objective lens system 6. Specifically, the overall numerical aperture NA of the objective lens system 6 is set to two illustrative values of 0.55 and 0.84.

If, for example, $\Delta t$ is varied 0.01 mm, the spherical aberration $E_{40}$ for NA=0.55 exceeds 0.075$\lambda$. The spherical aberration $E_{40}$ for NA=0.84 far exceeds 0.3$\lambda$. Conversely, the spherical aberration $W'_{40}$ for NA=0.55 and 0.84 is 0.01$\lambda$ or less. In particular, the spherical aberration $W'_{40}$ for NA=0.84 only slightly exceeds 0.05$\lambda$ even if $\Delta t$ is 0.03 mm.

Thus, with the optical pickup device of the instant embodiment, in which the above-mentioned objective lens system 6 is employed as a converging system and in which the distance between the optical disc 20 and the surface of the semi-spherical lens facing the optical disc 20 is maintained constant, the tolerance value for errors in the disc substrate thickness may be significantly increased as compared to the case of employing only the conventional objective lens, thus improving the production yield of the optical disc.

Figure 7:
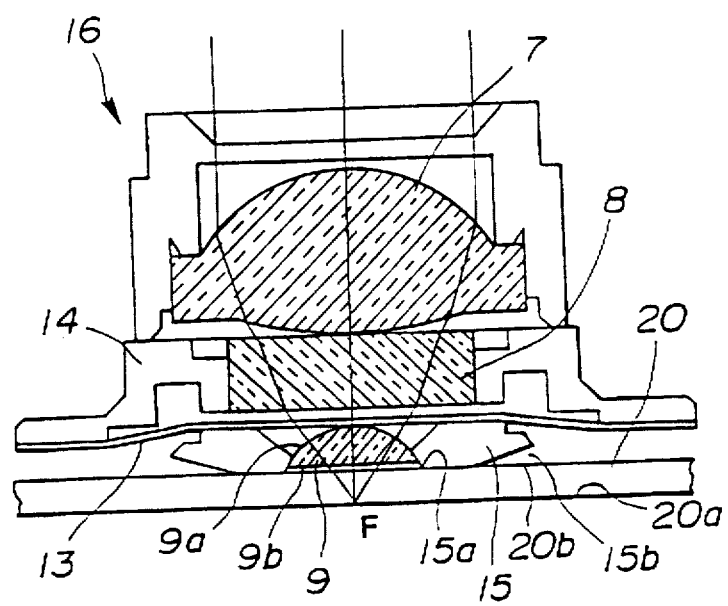
FIG. 7 is a detailed view of an objective lens system of a modification of the optical pickup device according to the present invention.
Figure 8:
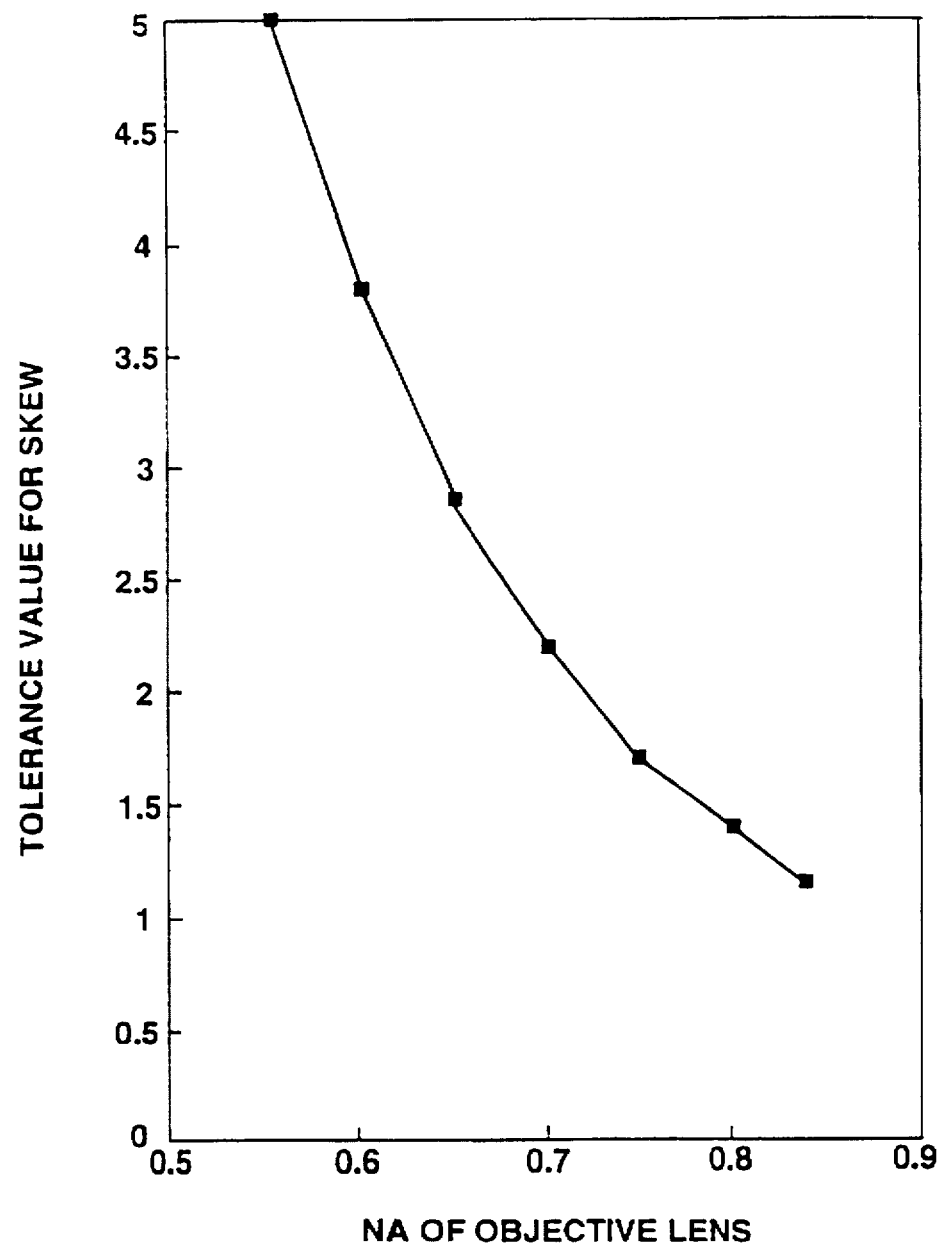
FIG. 8 is a graph showing the tolerance values of skew plotted against the numerical aperture of an objective lens of a conventional optical pickup device.

The optical pickup device of the present invention is not limited to the above-described embodiment. For example, the objective lens system 6 may be configured as shown in FIG. 7. An optical pickup device employing an objective lens system 16 shown in FIG. 7 is now explained as a modified embodiment of the present invention. The construction of the present modification is the same as that of the embodiment shown in FIG. 1 except the objective lens system 16 and hence is not explained herein specifically.

The objective lens system 16 is of substantially the same construction as the objective lens system shown in FIG. 2 and hence the same components of the objective system 16 are specified by the same numerals. The objective system 16 shown in FIG. 7 differs from the objective lens system 6 shown in FIG. 2 only with respect to the shape and the operation of a slider 15.

The present objective system 16 is made up of an objective lens 7, a correction plate 8, a semi-spherical lens 9, a slider 15, a spring plate 13 and a lens barrel 14. The objective lens 7, correction plate 8 and the lens barrel 14 are constrained in all directions without having any degree of freedom. The lens barrel 14 and the slider 15 are interconnected by the spring plate 13 and have the degree of freedom of translatory movement in a direction along the plate thickness of the disc 20 and of tilting movement in a direction of following up with the tilt of the disc 20.

The slider 15 is formed with an incision directed towards the disc 20 for defining an air inlet 15b. The slider 15 has a slide surface 15a which, on rotation of the disc 20, generates a floating force by a viscous film of air generated on the surface of the disc 20 on the side of the light incident surface 20b. This floating force is in equilibrium with the thrusting force exerted by the spring plate 13 so that an air layer is formed between the slide surface 15a and the surface 20b of the disc 20. This causes the slider 15 to be floated so as to substantially follow up with the disc surface. The spring plate 13 does not have the degree of freedom of translatory movement in a direction parallel to the disc surface so that no position shift will be produced in a direction parallel to the objective lens 7 and the plane 9b of the semi-spherical lens 9. In addition, the slide surface 15a of the slider 15 and the surface 9b of the semi-spherical surface 9 are substantially parallel to each other and are substantially co-planar in an area in which the semi-spherical lens 9 is not contacted with the disc 20.

Since the operation of the objective lens system 16 is the same as that of the objective lens system 6 of the previous embodiment, the reproducing density of the optical disc 20 may be increased even with the use of the optical pickup device employing the objective lens system 16. Since the tolerance for warping during molding of the disc or warping due to moisture absorption may be increased, the production yield or the degree of freedom in selecting the disc material may be increased. On the other hand, the tolerance value for the orthogonality between the optical axis and the disc mounting surface in the optical disc drive or the tolerance for pickup feed accuracy may be increased thus reducing the cost of the optical disc drive. In addition, since there is no necessity of appending a disc skew correction mechanism in the optical disc drive, the device may be reduced in cost and weight, while being improved in operational reliability. The tolerance value for errors in the disc thickness may be increased thus improving the yield of disc manufacture.

Although the diameter of the light spot formed on the signal recording surface of the optical disc is reduced in the instant embodiment, the recording density may similarly be improved if the magnetic field is modulated as the light spot is reduced in diameter.

What is claimed is:

1. An optical pickup device for collecting the light from a light source on a signal recording surface of an optical recording surface, comprising:

at least one objective lens;

a lens holder for holding said objective lens;

a convex lens having a planar surface facing the optical recording medium and having a pre-set refractive index;

a slider configured for securing said convex lens and for being floated over said optical recording medium; and floating supporting means connecting with said lens holder and said slider for floating and supporting said slider over said optical recording medium.

2. The optical recording medium as claimed in claim 1, further comprising correction means arranged between said objective lens and said convex lens for correcting the light incident on said objective lens from the light source into a spherical wave centered about a pre-set position with respect to the optical axis on a signal recording surface of the optical recording medium.

3. The optical recording medium as claimed in claim 1, wherein said slider is floated by intake of air generated on rotation of said optical recording medium via an air inlet.

4. An optical pickup device s in claim 1, wherein said floating supporting means is a spring plate.

5. An optical pickup device as in claim 1, wherein said objective lens has a numerical aperture NA=sin θ.

6. An optical device as in claim 5, wherein θ is an angle said objective lens subtends at a minimum size spot.

7. An optical device as in claim 1, wherein said floating supporting means and said objective lens holder have a degree of freedom of translatory movement in a direction of a thickness of said optical recording medium.

8. An optical device as in claim 1, further comprising correction means arranged between said objective lens and said convex lens, for correcting a light incident on said objective lens from the light source into a spherical wave centered about a pre-set position on a signal recording surface of the optical recording medium.

9. An optical pickup device for collecting a light from a light source on a signal recording surface of an optical recording device, comprising:

a first objective lens;

a lens barrel holding said first objective lens;

a second objective lens having a planar surface, and disposed between said optical recording medium and said first objective lens;

means for securing said second objective lens; and supporting means connecting said lens barrel with said securing means, and for supporting the securing means above, and out of contact with, said optical recording means.

10. An optical pickup device as in claim 9, wherein said means for securing said second objective lens comprised surfaces, at an angle relative to the signal recording surface of said optical recording device, for capturing air between said means for securing said second objective lens and said signal recording surface.

11. An optical pickup device as in claim 9, further comprising correction means arranged between said first objective lens and said second objective lens for correcting a light incident on said first objective lens from a light source into a spherical wave centered about a pre-set position on said signal recording surface of said optical recording medium.

* * * * *